(12) United States Patent
Chen

(10) Patent No.: US 11,546,252 B2
(45) Date of Patent: Jan. 3, 2023

(54) FAST FLOODING TOPOLOGY PROTECTION

(71) Applicant: Huawei Technologies Co., Ltd., Guangdong (CN)

(72) Inventor: Huaimo Chen, Bolton, MA (US)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/210,148

(22) Filed: Mar. 23, 2021

(65) Prior Publication Data

US 2021/0211376 A1 Jul. 8, 2021

Related U.S. Application Data

(63) Continuation of application No. PCT/US2020/022603, filed on Mar. 13, 2020.

(60) Provisional application No. 62/819,062, filed on Mar. 15, 2019.

(51) Int. Cl.
| | |
|---|---|
| *H04L 45/28* | (2022.01) |
| *H04L 43/0823* | (2022.01) |
| *H04L 45/12* | (2022.01) |
| *H04L 45/00* | (2022.01) |
| *H04L 45/24* | (2022.01) |
| *H04L 45/44* | (2022.01) |
| *H04L 41/0668* | (2022.01) |
| *H04L 45/48* | (2022.01) |
| *H04L 45/18* | (2022.01) |
| *H04L 49/55* | (2022.01) |

(52) U.S. Cl.
CPC .......... *H04L 45/28* (2013.01); *H04L 41/0668* (2013.01); *H04L 43/0823* (2013.01); *H04L 45/123* (2013.01); *H04L 45/18* (2013.01); *H04L 45/22* (2013.01); *H04L 45/24* (2013.01); *H04L 45/32* (2013.01); *H04L 45/44* (2013.01); *H04L 45/48* (2013.01); *H04L 49/557* (2013.01)

(58) Field of Classification Search
CPC ......... H04L 45/18; H04L 45/28; H04L 45/48; H04L 49/557; H04L 41/0668
See application file for complete search history.

(56) References Cited

U.S. PATENT DOCUMENTS

| | | | |
|---|---|---|---|
| 2011/0090787 A1 | 4/2011 | Smith et al. | |
| 2014/0198630 A1* | 7/2014 | Nof | H04L 45/48 370/216 |
| 2015/0163091 A1* | 6/2015 | Thubert | H04L 45/18 370/225 |

FOREIGN PATENT DOCUMENTS

CN 107181684 A 9/2017

OTHER PUBLICATIONS

Chen, H., "LS Flooding Reduction," draft-co-lsr-flooding-reduction-01, Jan. 7, 2019, 37 pages.

(Continued)

*Primary Examiner* — Kyung H Shin
(74) *Attorney, Agent, or Firm* — Conley Rose, P.C.

(57) ABSTRACT

A parallel flooding topology repair method performed by a node for repairing a flooding topology. The parallel flooding topology repair method detects a failed link and/or a failed node on a flooding topology, determines whether the failed link and/or failed node results in a flooding topology split, and repair the flooding topology by performing a local flooding topology repair process when the flooding topology is split.

24 Claims, 12 Drawing Sheets

(56) References Cited

OTHER PUBLICATIONS

Chen, H., "LS Distributed Flooding Reduction," draft-cc-lsr-flooding-reduction-03, Mar. 11, 2019, 24 pages.

* cited by examiner

900

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|         Type (TBD1)  902      |          Length  904          |
+-+-+-+-+-+-+-+-+-+-+-+-+-+-+-+-+-+-+-+-+-+-+-+-+-+-+-+-+-+-+-+-+
|                        Source Node ID  906                    |
+-+-+-+-+-+-+-+-+-+-+-+-+-+-+-+-+-+-+-+-+-+-+-+-+-+-+-+-+-+-+-+-+
|                      Destination Node ID  908                 |
+-+-+-+-+-+-+-+-+-+-+-+-+-+-+-+-+-+-+-+-+-+-+-+-+-+-+-+-+-+-+-+-+
~                       sub TLVs (optional)  910                ~
+-+-+-+-+-+-+-+-+-+-+-+-+-+-+-+-+-+-+-+-+-+-+-+-+-+-+-+-+-+-+-+-+
```

OSPF Backup Path End Points TLV

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+
|  Type (TBD2)1002|  Length (4) 1004|
+-+-+-+-+-+-+-+-+-+-+-+-+-+-+-+-+-+-+-+-+-+-+-+-+-+-+-+-+-+-+-+-+
|                 Extended Options and Flags  1006           |B|  |
+-+-+-+-+-+-+-+-+-+-+-+-+-+-+-+-+-+-+-+-+-+-+-+-+-+-+-+-+-+-+|P|-+
                                                              ↑
                                                             1008
```

EOF-TLV in IS-IS Hello

0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+
|   Type(TBD3)1102|     Length 1104  |
+-+-+-+-+-+-+-+-+-+-+-+-+-+-+-+-+-+-+-+-+-+-+-+-+-+-+-+-+-+-+-+-+
|                  Source Node ID (6 octets) 1106              ~
+-+-+-+-+-+-+-+-+-+-+-+-+-+-+-+-+-+-+-+-+-+-+-+-+-+-+-+-+-+-+-+-+
|               Destination Node ID (6 octets) 1108            ~
+-+-+-+-+-+-+-+-+-+-+-+-+-+-+-+-+-+-+-+-+-+-+-+-+-+-+-+-+-+-+-+-+
~                    sub TLVs (optional) 1110                  ~
+-+-+-+-+-+-+-+-+-+-+-+-+-+-+-+-+-+-+-+-+-+-+-+-+-+-+-+-+-+-+-+-+

IS-IS Backup Path End Points TLV
```

FIG. 11

FAST FLOODING TOPOLOGY PROTECTION

CROSS-REFERENCE TO RELATED APPLICATIONS

This application is a continuation of International Application No. PCT/US2020/022603 filed on Mar. 13, 2020, by Futurewei Technologies, Inc., and titled "Fast Flooding Topology Protection," which claims the benefit of U.S. provisional patent application No. 62/819,062 filed Mar. 15, 2019, by Huaimo Chen and titled "Fast Parallel Protect Flooding Topology," each of which is hereby incorporated in its entirety by reference.

TECHNICAL FIELD

The present application relates to network communication, and more specifically to a system and method for fast flooding topology protection.

BACKGROUND

A routing protocol specifies how routers communicate with each other, distributing information that enables them to select routes between any two nodes on a computer network. An interior gateway protocol (IGP) is a type of protocol used for exchanging routing information between gateways (commonly routers) within an autonomous system (AS). This routing information can then be used to route network-layer protocols like Internet Protocol (IP) packets. An AS is a collection of connected IP routing prefixes under the control of one or more network operators on behalf of a single administrative entity or domain that presents a common, clearly defined routing policy to the internet (for example, a system of corporate local area networks).

Within IGP, there are different types. Type 1 IGP is referred to as a link-state routing protocol. The link-state routing protocol is performed by every switching node in the network (i.e., nodes that are prepared to forward packets; in the Internet, these are called routers). The basic concept of link-state routing is that every node constructs a map of the connectivity to the network, in the form of a graph, showing which nodes are connected to which other nodes. Each node then independently calculates the best logical path or the best next hop interface from it to every possible destination in the network. Each collection of best paths will then form each node's routing table. Examples of link-state routing protocols include Open Shortest Path First (OSPF) routing protocol and Intermediate System to Intermediate System (IS-IS or ISIS).

OSPF is a standard routing protocol designated by the Internet Engineering Task Force (IETF). OSPF uses Link State Advertisement (LSA) to exchange routing information between routers. Each router within an area will flood a type 1 LSA (also called router LSA) within the area. LSA's are encapsulated behind an OPSF packet and then an IP packet. An area is a logical group of OSPF-based networks, routers, and links that have the same area number. Routers that belong to the same area keep a topological database for the entire area. The router LSA contains information about directly connected links in the area to which the router belongs (e.g., a list with all the directly connected links of this router). They are flooded to all routers in that area. If the router is an ABR (Area Border Router), it generates type 1 LSAs for all the areas to which it is connected and sends those LSAs to all neighbors in corresponding areas.

IS-IS is a routing protocol standardized by the International Standards Organization (ISO). IS-IS uses Link State Protocol Data Unit (LSP) to exchange routing information between routers. LSP is a packet of information generated by a network router in a link state routing protocol that lists the router's neighbors. A LSP packet can also be further defined as special datagrams that determine the names of, and the cost or distance to, any neighboring routers and associated networks. They are used to efficiently determine what the new neighbor is, if a link failure occurs, and the cost of changing a link if the need arises.

Some additional differences between OSPF and IS-IS are that OSPF supports non-broadcast multiple access network (NBMA) and point-to-multipoint links, whereas IS-IS does not; IS-IS runs on the data link layer (L2), whereas OSPF runs on the network layer (L3); and OSPF supports virtual link, whereas IS-IS does not.

Irrespective of which IGP routing protocol is used, as a network becomes bigger and bigger, IGP routing convergence is slower and slower when a change such as a link failure occurs in the network. IGP convergence occurs when all components of every router in the network, including the Routing Information Base (RIB) and Forwarding Information Base (FIB), along with software and hardware tables, are provided with the most recent route change(s) such that forwarding for a route entry is successful on the Best Egress (or say next hop) Interface.

One or multiple failures may split the flooding topology (FT) even though the underlying (physical) topology is not split. Computing and building a new FT, and flooding the new FT from the leader node to every node in the network takes time. During this time, link-state databases (LSDBs) may be out of synchronization, and network convergence is slowed down.

SUMMARY

The disclosed embodiments seek to resolve the above problems. In an embodiment, when multiple failures occur at almost the same time, every node in a network area, in parallel, detects the link and/or node failure, detects a FT split, and repairs the one or more link and/or node failures. In an embodiment, to repair the one or more link and/or node failures, every node or some of the nodes in a FT compute backup paths in parallel for a link and/or node failure on the FT that causes a FT split. A backup path is a path or a sequence of links, when a link on FT goes down, providing a connection to connect two parts of a split FT. When a node on FT goes down, the FT may be split into more than two parts. In this case, two or more backup paths are needed to connect all the split parts into one. In an embodiment, the nodes along the backup paths flood a link state (either an LSA or LSP) to every live node through the remaining FT and the backup paths to repair the one or more link and/or node failures. Utilizing the disclosed embodiments provides a faster process for detecting and repairing FT split when multiple failures happen. This results in faster network convergence, which in turn results in less packet loss.

As referenced herein, the term "parallel" means that two or more network nodes or nodes, in no particular order, independently execute the processes described in the disclosed embodiments. The independent execution of the processes by the network nodes can be performed concurrently, but does not require complete synchronization.

In an alternative embodiment, the FT split can be repaired sequentially. In an embodiment, only the node next to a failure detects the link and/or node failure on the FT that causes a FT split. For instance, in an embodiment, when the node attached to the failure point (i.e., failed link or node) detects the failure first, the node determines whether the FT is split, and then repairs the failures (i.e., repairs the FT split) itself by computing backup paths and adding its local links on the backup paths to the FT temporarily until a new FT is built. The node then requests the related nodes (i.e., nodes that need to add its local links on the backup paths to the FT temporarily if they are not already on the FT) to repair the failures. In an embodiment, the sequential process is slower than the parallel process, and makes the network convergence time longer.

A first aspect relates to parallel flooding topology repair method performed by a node for repairing a flooding topology. The parallel flooding topology repair method includes detecting a network failure, the network failure being at least one of a failed link and a failed node; determining whether the network failure is on the flooding topology; determining whether the flooding topology is split in response to a determination that the network failure is on the flooding topology; and repairing the flooding topology by performing a local flooding topology repair process in response to a determination that the flooding topology is split.

In a first implementation form of the computer-implemented method according to the first aspect, the local flooding topology repair process includes computing a backup path for the network failure to repair the flooding topology; determining whether the backup path traverses the node; determining whether local links of the node on the backup path are on the flooding topology in response to a determination that the backup path traverses the node; and adding the local links of the node on the backup path into the flooding topology temporarily until a new flooding topology is built in response to a determination that the local links of the node on the backup path are not on the flooding topology.

In a second implementation form of the computer-implemented method according to the first aspect or any preceding implementation form of the first aspect, the failed link is detected locally through a link down event.

In a third implementation form of the computer-implemented method according to the first aspect or any preceding implementation form of the first aspect, the failed link is detected by identifying a link in a link state database (LSDB) of the node that is not in a received link state.

In a fourth implementation form of the computer-implemented method according to the first aspect or any preceding implementation form of the first aspect, the failed node is detected by determining that every link attached to the failed node has failed.

In a fifth implementation form of the computer-implemented method according to the first aspect or any preceding implementation form of the first aspect, the failed link is on the flooding topology when there is a flag for the failed link in the LSDB indicating that the failed link is on the flooding topology.

In a sixth implementation form of the computer-implemented method according to the first aspect or any preceding implementation form of the first aspect, the failed link is on the flooding topology when the failed link is in a link state in the LSDB for the flooding topology.

In a seventh implementation form of the computer-implemented method according to the first aspect or any preceding implementation form of the first aspect, the failed node is on the flooding topology when there is a link on the flooding topology that connects to the failed node.

In an eighth implementation form of the computer-implemented method according to the first aspect or any preceding implementation form of the first aspect, the failed node is on the flooding topology when the failed node is in a link state in the LSDB for the flooding topology.

In a ninth implementation form of the computer-implemented method according to the first aspect or any preceding implementation form of the first aspect, wherein determining whether the flooding topology is split by the failed link includes determining whether there is a path on the flooding topology between a first node and a second node that was connected by the failed link, and wherein the flooding topology is determined to be split by the failed link when there is no path on the flooding topology between the first node and the second node that was connected by the failed link, and the flooding topology is determined to be not split by the failed link when there is the path on the flooding topology between the first node and the second node that was connected by the failed link.

In a tenth implementation form of the computer-implemented method according to the first aspect or any preceding implementation form of the first aspect, wherein determining whether the flooding topology is split by the failed link includes determining a first number of nodes on the flooding topology by traversing the flooding topology; comparing the first number of nodes on the flooding topology to a second number of nodes on the flooding topology maintained in the LSDB; and determining that the flooding topology is split when the first number of nodes on the flooding topology is less than the second number of nodes on the flooding topology.

In an eleventh implementation form of the computer-implemented method according to the first aspect or any preceding implementation form of the first aspect, wherein determining whether the flooding topology is split by the failed node includes determining whether the node has a direct link to the failed node; determining whether there is a path on the flooding topology between the node and every other node that was directly connected to the failed node; and determining that the flooding topology is split by the failed node when there is no path on the flooding topology between the node and every other node that was directly connected to the failed node.

In a twelfth implementation form of the computer-implemented method according to the first aspect or any preceding implementation form of the first aspect, wherein determining whether the flooding topology is split by the failed node includes determining a first number of nodes on the flooding topology by traversing the flooding topology; comparing the first number of nodes on the flooding topology to a second number of nodes on the flooding topology maintained in the LSDB; and determining that the flooding topology is split when the first number of nodes on the flooding topology is less than the second number of nodes on the flooding topology.

In a thirteenth implementation form of the computer-implemented method according to the first aspect or any preceding implementation form of the first aspect, wherein computing the backup path for the failed link to repair the flooding topology includes computing the backup path between a first node and a second node connected by the failed link.

In a fourteenth implementation form of the computer-implemented method according to the first aspect or any preceding implementation form of the first aspect, wherein computing the backup path for the failed node to repair the flooding topology includes computing the backup path between a first node that was directly connected to the failed node and every other node that was directly connected to the failed node.

In a fifteenth implementation form of the computer-implemented method according to the first aspect or any preceding implementation form of the first aspect, wherein the local flooding topology repair process is repeated for each of the network failures that results in the flooding topology to be split.

A second aspect relates to sequential flooding topology repair method performed by a node attached to a network failure for repairing a flooding topology. The sequential flooding topology repair method includes detecting the network failure, the network failure being at least one of a failed link and a failed node; determining whether the network failure is on the flooding topology; determining whether the flooding topology is split in response to a determination that the network failure is on the flooding topology; and repairing the flooding topology by performing a sequential flooding topology repair process in response to a determination that the flooding topology is split.

In a first implementation form of the computer-implemented method according to the second aspect, wherein sequential flooding topology repair process includes computing a first backup path from the node to each of the other nodes connected to the network failure; determining whether local links of the node on the backup path are on the flooding topology; adding the local links of the node on the backup path into the flooding topology temporarily until a new flooding topology is built in response to a determination that the local links of the node on the backup path are not on the flooding topology; and sending a flooding topology repair request to a next hop node along the backup path.

A third aspect relates to sequential flooding topology repair method performed by a node attached to a network failure for repairing a flooding topology. The sequential flooding topology repair method includes receiving a flooding topology repair request; determining whether local links of the node on a backup path are on the flooding topology; adding the local links of the node on the backup path into the flooding topology temporarily until a new flooding topology is built in response to a determination that the local links of the node on the backup path are not on the flooding topology; and sending the flooding topology repair request to a next hop node along the backup path.

In a first implementation form of the computer-implemented method according to the third aspect, the sequential flooding topology repair method further includes extracting the backup path from the flooding topology repair request.

In a second implementation form of the computer-implemented method according to the third aspect or any preceding implementation form of the third aspect, the sequential flooding topology repair method further includes computing the backup path from the node to an end node of the backup path when the flooding topology repair request does not include the backup path.

In a third implementation form of the computer-implemented method according to the third aspect or any preceding implementation form of the third aspect, the flooding topology repair request is an extended Hello packet.

In a fourth implementation form of the computer-implemented method according to the third aspect or any preceding implementation form of the third aspect, the extended Hello packet is an Open Shortest Path First (OSPF) Hello packet that includes a backup path bit (BP-bit) in an Extended Options and Flags field of an Extended Options and Flag—Type-Length-Value (EOF-TLV) in the OSPF Hello packet.

In a fifth implementation form of the computer-implemented method according to the third aspect or any preceding implementation form of the third aspect, the BP-bit is set to one to indicate that a link on the backup path connecting a sending node and a receiving node is temporarily added on the flooding topology by the sending node.

In a sixth implementation form of the computer-implemented method according to the third aspect or any preceding implementation form of the third aspect, the OSPF Hello packet includes a backup path endpoints TLV defined in a link-local signaling (LLS) data block of the OSPF Hello packet, the backup path endpoints TLV comprising two end nodes of the backup path.

In a seventh implementation form of the computer-implemented method according to the third aspect or any preceding implementation form of the third aspect, the flooding topology repair request is an extended Intermediate System to Intermediate System (IS-IS) Hello packet.

In an eighth implementation form of the computer-implemented method according to the third aspect or any preceding implementation form of the third aspect, the extended Hello packet is an IS-IS Hello packet that includes a backup path bit (BP-bit) in an Extended Options and Flags field of an EOF-TLV in the IS-IS Hello packet.

In a ninth implementation form of the computer-implemented method according to the third aspect or any preceding implementation form of the third aspect, the BP-bit is set to one to indicate that a link on the backup path connecting a sending node and a receiving node is temporarily added on the flooding topology by the sending node.

In a tenth implementation form of the computer-implemented method according to the third aspect or any preceding implementation form of the third aspect, wherein the IS-IS Hello packet includes a backup path endpoints TLV that comprises two end nodes of the backup path.

A fourth aspect relates to a network node that includes a memory storing instructions; and a processor coupled to the memory, the processor configured to execute the instructions to cause the network node to perform any of the preceding aspects or any preceding implementation of the preceding aspects.

For the purpose of clarity, any one of the foregoing embodiments may be combined with any one or more of the other foregoing embodiments to create a new embodiment within the scope of the present disclosure.

These and other features, and the advantages thereof, will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 10 is a schematic diagram illustrating a data structure of an EOF-TLV in accordance with an embodiment of the present disclosure.

FIG. 11 is a schematic diagram illustrating a data structure of an IS-IS Backup Path End Points TLV in accordance with an embodiment of the present disclosure.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As stated above, one or multiple failures may split the FT even though the underlying (physical) topology is not split. Computing and building a new FT, and flooding the new FT to every node in the network from the leader node takes time. During this time, LSDBs may be out of synchronization, and network convergence is slowed down. The disclosed embodiments of the present disclosure seek to address the above issues by providing various systems and methods for fast parallel protect FT.

In an embodiment, every node or some of the nodes in a FT compute backup paths in parallel for a link and/or node failure on the FT that causes a FT split. The nodes along the backup paths flood a link state to every live node through the remaining FT and the backup paths to repair one or more link and/or node failures. The remaining FT is the FT topology with the failed links and nodes removed from the FT.

Figure 1:
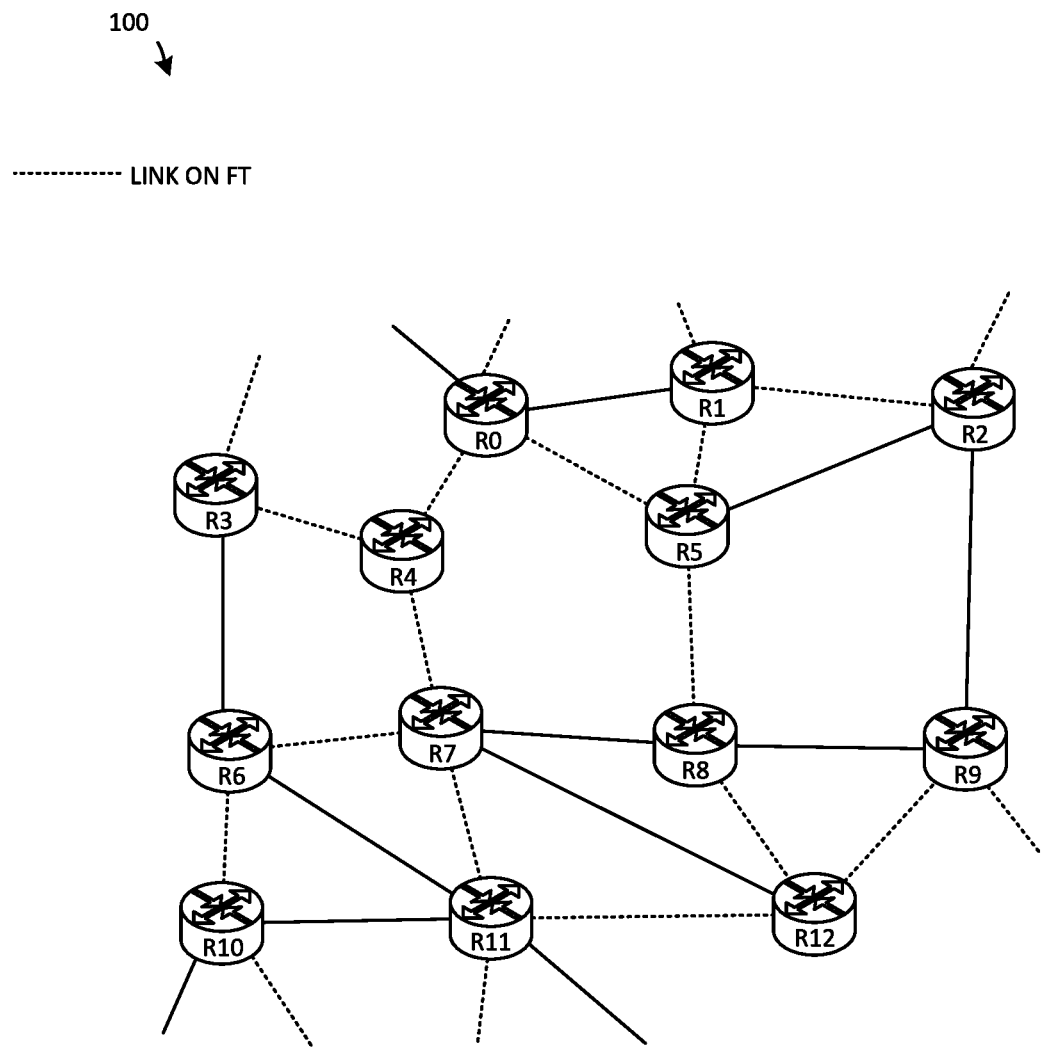
FIG. 1 is a schematic diagram illustrating a network topology and a flooding topology (FT) according to an embodiment of the present disclosure.

FIG. 1 is a schematic diagram illustrating a network topology 100 and a flooding topology (FT) according to an embodiment of the present disclosure. The network topology 100 comprises routers R0 through R12, and their depicted links (solid and dashed lines) connecting the routers in the network topology 100. The FT is a sub-network of the (physical) network topology 100. In the depicted embodiment, the FT is depicted by the dash lines connecting routers R0 through R12. The FT has the same reachability to every node, routers R0 through R12, as the network topology 100. The FT is used for distributing link state information of each of the routers in the network topology 100 (i.e., LSAs are flooded on the FT for OSPF, LSPs for IS-IS). In FIG. 1, suppose that R0's Identifier (ID) is less than R1's ID, R1's ID is less than R2's ID, and so on (i.e., R0's ID<R1's ID<R2's ID<<R12's ID). During normal operating conditions (i.e., no failures in the network), every node (e.g., routers R0 through R12 in FIG. 1) has the same link-state database (LSDB), the same network topology 100, and the same FT. The LSDB is the database that OSPF builds and is based on the information distributed in LSAs by each of the network nodes/routers. The LSDB is synchronized between routers within the same area.

When there is a link or node failure on the FT on the network topology 100, each of the network nodes or a designated network node computes a backup path for a failure in the network topology 100. As an example, a network node can execute an algorithm to obtain a minimum hop count path from router Ri to router Rj for the failure of link Ri-Rj on the FT. Routers Ri and Rj can be any two routers on the FT in the network topology 100 (e.g., R5 and R8). Like Shortest Path First (SPF), any link used in the backup path must be bi-directional. In an embodiment, for a failure of a link Ri-Rj on the FT, each node (Rk) computes a unique backup path for link Ri-Rj (assume Ri's ID<Rj's ID) by obtaining all the minimum hop count paths from Ri to Rj, wherein each minimum hop count path has a hop count on the FT (HC-FT) value. If there are multiple paths that have a minimum HC-FT value, the network node selects the path containing the links having smaller or smallest remote node IDs along the direction from destination router Rj to source router Ri. The node Rk on the backup path then enables the backup path for link Ri-Rj for temporary flooding on the backup path by adding its local links on the backup path to the FT temporarily if they are not already on the FT.

Figure 2:
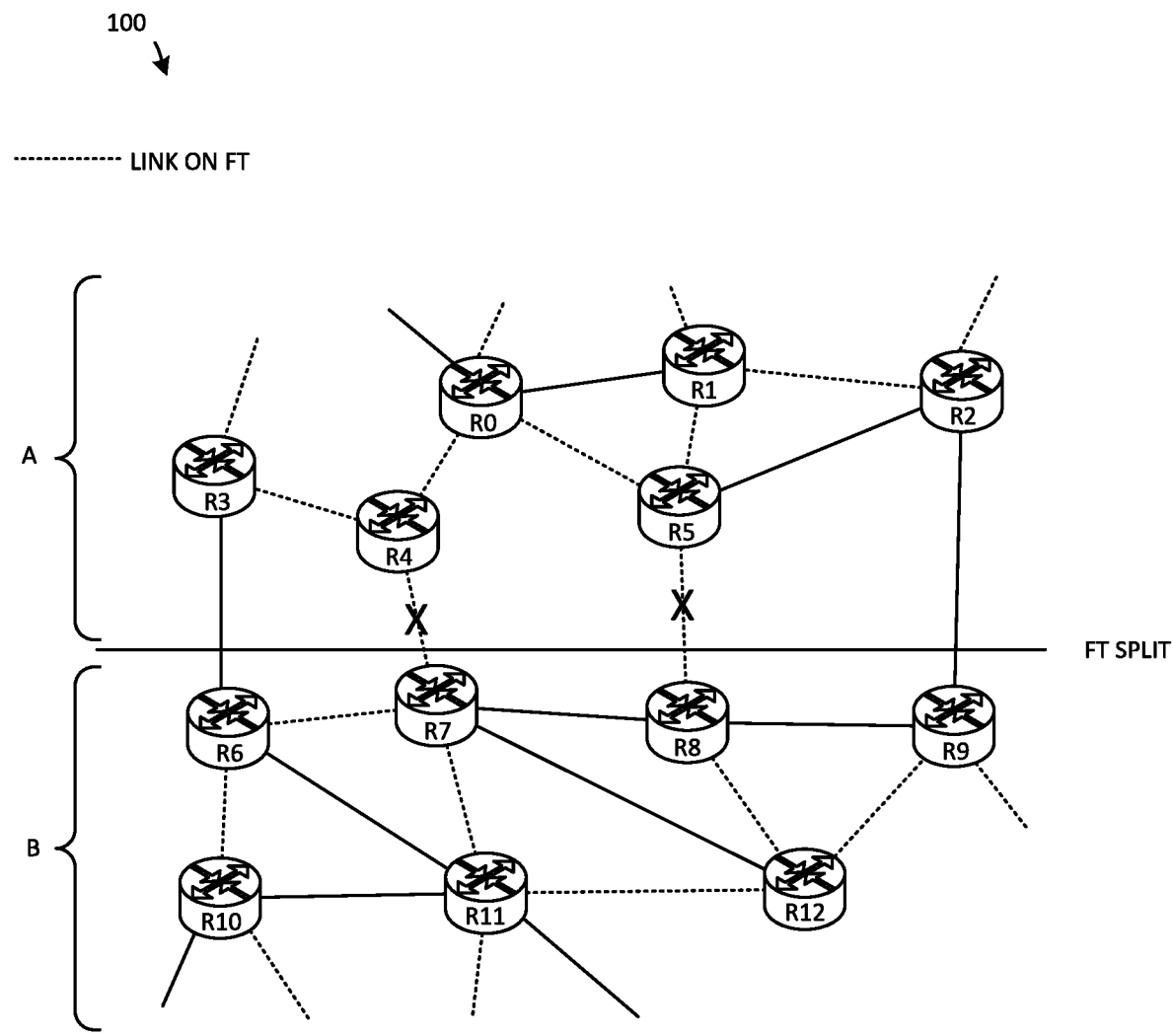
FIG. 2 is a schematic diagram illustrating a split FT according to an embodiment of the present disclosure.

FIG. 2 is a schematic diagram illustrating a split FT according to an embodiment of the present disclosure. In the depicted embodiment, the FT (as described in FIG. 1) is split when the link R4 to R7 (R4-R7), and the link R5-R8, on the FT fail at the same time. Here, the FT is split into two partitions, FT partition A and FT partition B, as shown in FIG. 2. FT partition A includes routers R0, R1, R2, R3, R4, and R5. FT partition B includes routers R6, R7, R8, R9, R10, R11, and R12. In FT partition A, every node (routers R0, R1, R2, R3, and R5) receives an LSA from router R4 indicating that the link from router R4 to router R7 is down. Additionally, in FT partition A, every node (routers R0, R1, R2, R3, and R4) receives an LSA from router R5 indicating that the link from router R5 to router R8 is down.

Similarly, in FT partition B, every node (routers R6, R8, R9, R10, R11, and R12) receives an LSA from router R7 indicating that the link from router R7 to router R4 is down. Additionally, in FT partition B, every node (routers R6, R7, R9, R10, R11, and R12) receives an LSA from router R8 indicating that the link from router R8 to router R5 is down.

Figure 3:
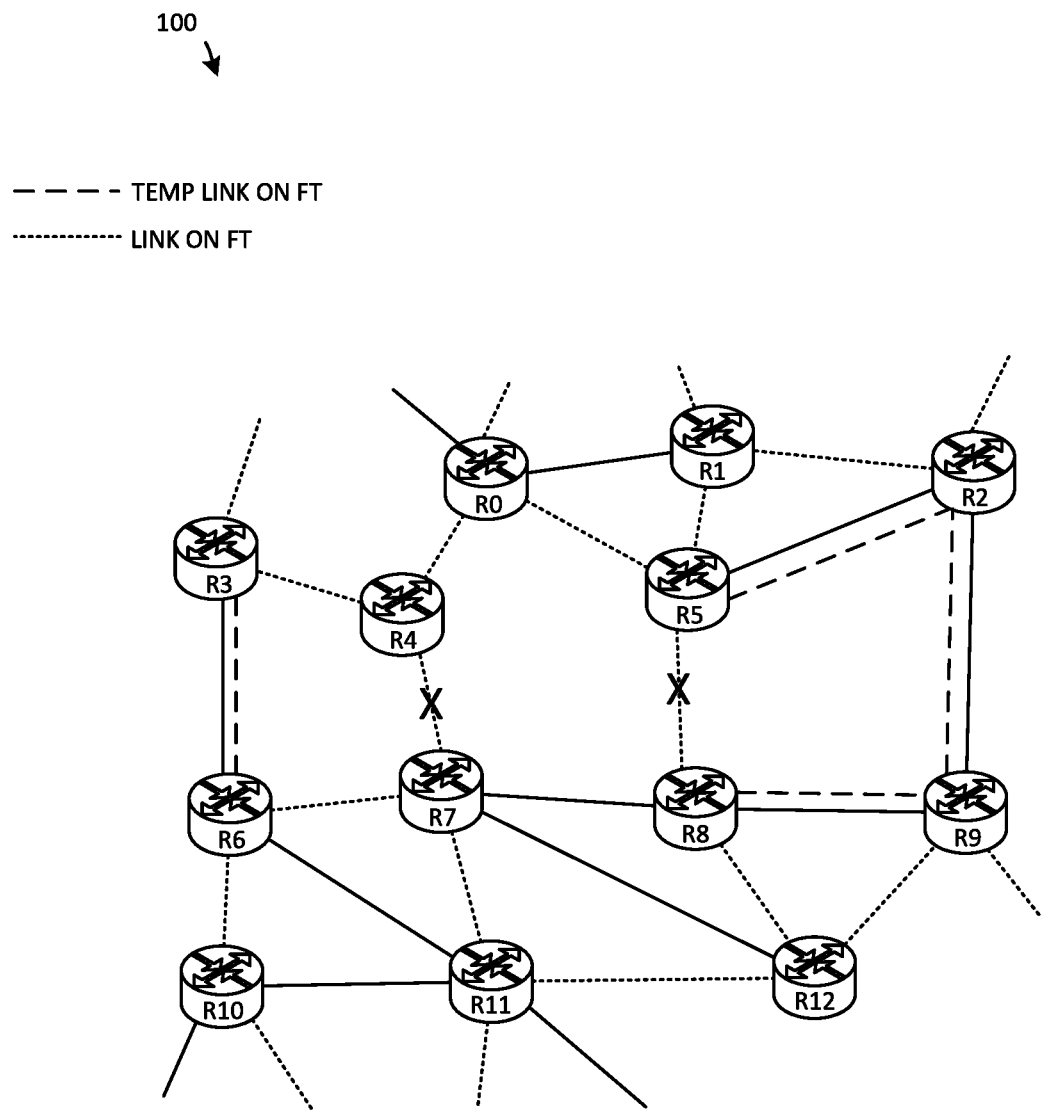
FIG. 3 is a schematic diagram illustrating a repaired FT according to an embodiment of the present disclosure.

FIG. 3 is a schematic diagram illustrating a repaired FT according to an embodiment of the present disclosure. In the depicted embodiment, the split FT (as described in FIG. 2) is repaired by computing a unique backup path for link R4-R7, and a unique backup path for link R5-R8, and then enabling the backup paths for temporary flooding. For link R4-R7, the backup path is computed by routers R4, R3, R6, R7, and other nodes in the FT. In an embodiment, routers R3 and R4 in partition A compute the backup path, and R6 and R7 in partition B compute the backup path. In partition A, there are two uni-directional links, a link from router R7 to router R4, and a link from router R8 to router R5, that are not used by routers R3 and R4 in the backup path computations. Similarly, in partition B, there are two uni-directional links, a link from router R4 to router R7, and a link from router R5 to router R8, that are not used by routers R6 and R7 in the backup path computations. In the depicted embodiment, a backup path for link R4-R7 is R4-R3-R6-R7. To create the backup path R4-R3-R6-R7, router R3 adds link R3-R6; and router R6 adds link R6-R3 to the FT temporarily as depicted in FIG. 3. The backup path is then enabled for temporary flooding by routers R4, R3, R6, and R7. As previously shown in FIG. 1, the link R4-R3 is already on the FT. Thus, routers R4 and R3 will not add the link R4-R3 to the FT again. Similarly, because the link R6-R7 is already on the FT, routers R6 and R7 will not add it to the FT again.

Similarly, a unique backup path for link R5-R8 is computed and then enabled for temporary flooding. For link R5-R8, the backup path is computed by routers R5, R2, R9, R8, and other nodes in the FT. In an embodiment, routers R2 and R5 in partition A compute the backup path, and routers R8 and R9 in partition B compute the backup path. As stated above, in partition A, there are two uni-directional links: a link from router R7 to router R4, and a link from router R8 to router R5, that are not used by router R2 and router R5 in the backup path computations. In partition B, there are two uni-directional links, a link from router R4 to router R7, and a link from router R5 to router R8, that are not used by router R8 and router R9 in the backup path computations. In the depicted embodiment, a backup path for link R5-R8 is R5-R2-R9-R8. To create the backup path R5-R2-R9-R8, router R5 adds link R5-R2 to the FT temporarily, router R2 adds link R2-R5 to the FT temporarily, router R2 adds link R2-R9 to the FT temporarily, router R9 adds link R9-R2 to the FT temporarily, router R9 adds link R9-R8 to the FT temporarily, and router R8 adds link R8-R9 to the FT temporarily. Routers R5, R2, R9, and R8 then enable the backup path R5-R2-R9-R8 for temporary flooding. The FT partition A and FT partition B are connected by the links added to the FT temporarily, and thus repairs the FT split.

Figure 4:
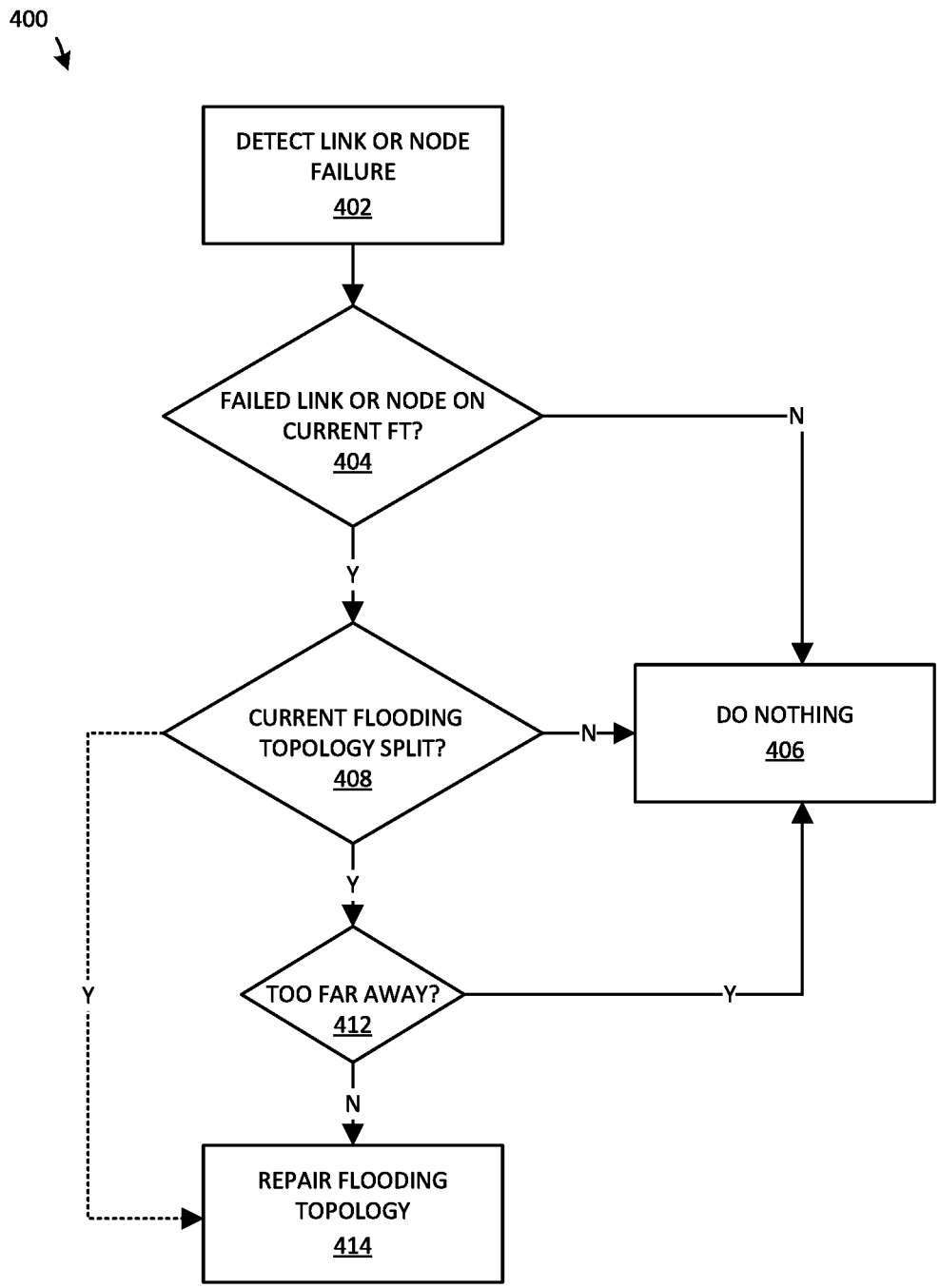
FIG. 4 is a flow chart illustrating a parallel FT repair process according to an embodiment of the present disclosure.

FIG. 4 is a flow chart illustrating a parallel FT repair process 400 according to an embodiment of the present disclosure. In an embodiment, the parallel FT repair process 400 can be performed in parallel by each node in a network area (e.g., routers R0 through R12 on network topology 100 in FIG. 1) to detect link and/or node failures, detect FT split, and repair the one or more link/node failures. By performing the process in parallel, the parallel FT repair process 400 provides fast FT split protection when multiple failures occur.

The parallel FT repair process 400 begins at step 402 by detecting a link or node failure. In an embodiment, if the node is attached to the failed link, it detects the failure locally through a link down event; otherwise, it determines the failed link by comparing the corresponding link state information in its LSDB with the link state information received in an LSA from another node on the FT. The failed link is the link that is in the link state information in the LSDB, but not in the link state information received in the LSA. If a node detects the failure of every link attached to the node, then the node itself has failed.

At step 404, the parallel FT repair process 400 determines whether the failed link or the failed node is on the current FT. In one embodiment, if there is a flag for the failed link in the LSDB of the network node indicating that the link is on the FT, then the failed link is on the current FT. In another embodiment, if the failed link is in a link state in the LSDB for the FT, then it is on the current FT. For a failed node, in an embodiment, the parallel FT repair process 400 determines whether the failed node is on the current FT by determining whether there is a link on the current FT that connects the failed node. In one embodiment, if there is a flag for one failed link attached to the failed node in the LSDB indicating that the link is on the current FT, then the failed node is on the current FT. In another embodiment, if the failed node is in a link state in the LSDB for the current FT, then the failed node is on the current FT.

If, at step 404, the parallel FT repair process 400 determines that the failed link or failed node is not on the current FT, the parallel FT repair process 400 takes no further action at step 406, and terminates. However, if the parallel FT repair process 400 determines that the failed link or failed node is on the current FT, the parallel FT repair process 400 determines whether the failed node or failed link causes the FT to split at step 408. A FT is split when the FT is separated into two or more distinct separate groups of nodes as shown in the given example in FIG. 2. In an embodiment, for a failed link on the current FT between node A and node B, the parallel FT repair process 400 can determine whether the current FT is split by attempting to find a path on the current FT from node A to node B (or from node B to node A). If a path is found on the current FT, then the parallel FT repair process 400 determines that the current FT is not split; otherwise (i.e., there is not any path from node A to node B on the current FT), the parallel FT repair process 400 determines that the current FT is split.

In another embodiment, for a failed link on the current FT between node A and node B, the parallel FT repair process 400 can determine whether the current FT is split by determining a first number of nodes on the current FT through traversing the current FT and maintaining a second number of active (or live) nodes in the LSDB of the network node. If the first number is less than the second number, then the parallel FT repair process 400 determines that the current FT is split. If the first number is greater than the second number, then there is a problem in the network or inside node X, and a warning is issued or logged.

In an embodiment, for a failed node on the current FT, for all the nodes connected to the failed node through the links on the current FT, the parallel FT repair process 400 determines whether the current FT is split by attempting to find a path on the current FT from one node connected to the failed node via the link on the current FT to each of the other nodes connected to the failed node via a link on the current FT. If a path is found on the current FT, then the parallel FT repair process 400 determines that the current FT is not split due to the failed node. Otherwise (i.e., there is not any path from one node connected to the failed node via the link on the current FT to another node connected to the failed node via a link on the current FT), the parallel FT repair process 400 determines that the current FT is split due to the failed node.

In another embodiment, the parallel FT repair process 400 determines a first number of nodes on the current FT by traversing the current FT and maintains a second number of active or live nodes in the network node's LSDB. If the first number is less than the second number, then the parallel FT repair process 400 determines that the current FT is split due to the failed node. If the first number is greater than the second number, then there is a problem in the network or inside node X, and a warning is issued or logged.

If the parallel FT repair process 400 determines that a failed node or failed link does not cause the current FT to split, then the parallel FT repair process 400 takes no action, at step 406, and terminates.

In an embodiment, if the parallel FT repair process 400 determines that a failed node or failed link results in FT split, then the parallel FT repair process 400 determines, at step 412, whether the node (node X) that is executing the parallel FT repair process 400 is too far away from the failed node or failed link (i.e., the failure point). In an embodiment, the distance from a failure point can be user-specified (e.g., 5 hops from the failure point, or other predetermined number of hops from the failure point). In an embodiment, when node X is too far away from the failure point, the parallel FT repair process 400 takes no action, at step 406, and terminates. If the parallel FT repair process 400 determines that node X is not too far away from the failure point, then the parallel FT repair process 400, at step 414, repairs the FT (e.g., as described in FIG. 5). In an alternative embodiment, the parallel FT repair process 400 may skip step 412, and repair the FT, at step 414, irrespective of the distance of node X from the failure point.

Figure 5:
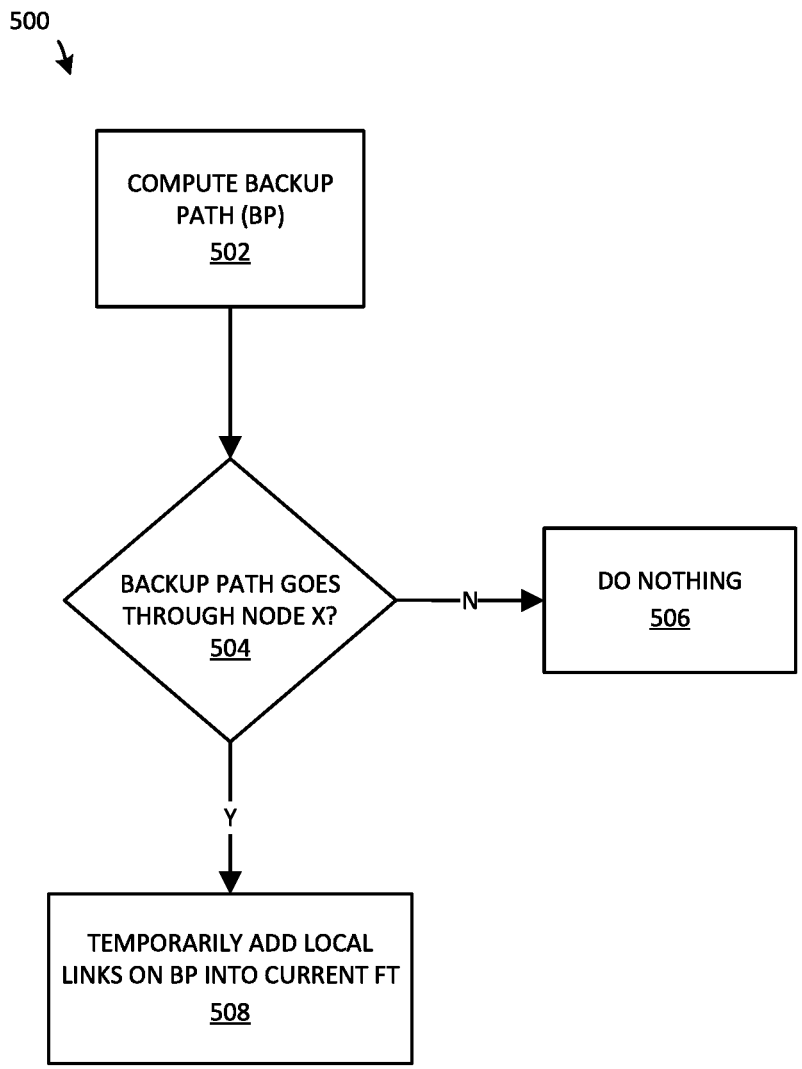
FIG. 5 is a flow chart illustrating a local FT repair process according to an embodiment of the present disclosure.

FIG. 5 is a flow chart illustrating a FT repair process 500 according to an embodiment of the present disclosure. In an embodiment, the FT repair process 500 is performed in parallel by each node (node X) in a network area (e.g., routers R0 through R12 on network topology 100 in FIG. 1). In an embodiment, the FT repair process 500 is performed at step 414 in FIG. 4.

The FT repair process 500, at step 502, computes a backup path for each of the failed links on the current FT. For example, to repair a single link failure on the current FT between node A and node B, the FT repair process 500, at step 502, computes a backup path between node A and node B. In an embodiment, the FT repair process 500 computes the backup path from the lower ID node to higher ID node. For instance, when node A's ID is less than node B's ID, the FT repair process 500 computes the backup path from node A to node B.

In an embodiment, if two or more adjacent links on the current FT fails, the FT repair process 500, at step 502, computes a backup path between the two end nodes of the adjacent failed links on the current FT. Two links on the current FT are considered adjacent links when they share a common node and there is no other link on the current FT that is attached to the common node. There is a single path between the two end nodes of the two adjacent links on the current FT (note that the common node is a transit node of the path). Similarly, there is a single path between the two end nodes of the two more adjacent links on the current FT.

In an embodiment, if there is a node failure on the current FT or two adjacent nodes fail on the current FT, the FT repair process 500, at step 502, computes a backup path between one node connected to the failed node via the link on the current FT and each of the other nodes connected to the failed node via a link on the current FT. Two nodes on the current FT are considered adjacent nodes on the current FT when they are connected directly.

At step 504, the FT repair process 500 determines whether the backup path goes through node X (i.e., the node executing the FT repair process 500). If the FT repair process 500 determines that the backup path does not go through node X, the FT repair process 500, at step 506, takes no further action and terminates.

If, at step 504, the FT repair process 500 determines that the backup path goes through node X, then the FT repair process 500, at step 508, retrieves the local links of node X (e.g., link L1 and L2) on the backup path and adds the local links of node X on the backup path into the current FT temporarily until a new FT is built if the local links of node X on the backup path are not on the current FT. If the local links of node X on the backup path are already on the current FT, then they do not need to be added to the current FT, and the FT repair process 500 terminates. By performing the FT repair process 500 in parallel by each of the nodes in a network area, the FT split is repaired.

Figure 6:
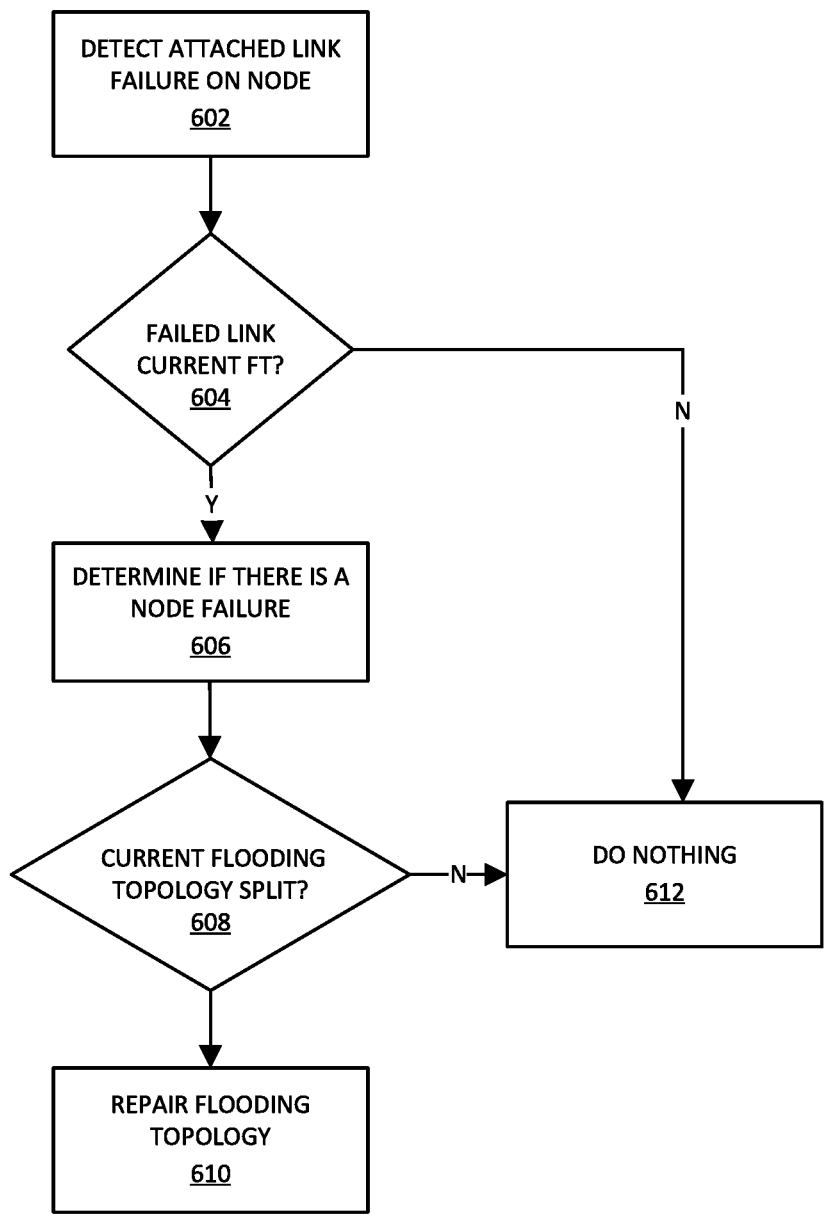
FIG. 6 is a flow chart illustrating a sequential FT repair process according to an embodiment of the present disclosure.

FIG. 6 is a flow chart illustrating a sequential FT repair process 600 according to an embodiment of the present disclosure. In an embodiment, the sequential FT repair process 600 is performed by the node attached to a Failure point (i.e., detecting failure by node next to failure). As will be further described, the node attached to the failure point detects the failure first (i.e., failed link or node), determines that the FT is split, and then repairs the failures itself and then requests the related nodes to repair the failures. This sequential process is slower than the parallel process (e.g., as described in FIG. 4) and needs more time for network convergence.

The sequential FT repair process 600 begins, at step 602, when the node attached to the link first detects a link failure. In an embodiment, the failure is detected locally through the link down event. At step 604, the sequential FT repair process 600 determines whether the failed link is on the current FT. In one embodiment, if there is a flag for the failed link in the LSDB indicating that the link is on the FT, then the failed link is on the current FT. In another embodiment, if the failed link is in a link state in the LSDB for the FT, then it is on the current FT.

At step 606, the sequential FT repair process 600 determines whether there is a node failure on the current FT. In an embodiment, to detect a node failure, the sequential FT repair process 600, at step 606, detects every other link on the current FT attached to the other end node (node X) of the failed link. For every other link, the node determines whether it is a failed link through comparing the corresponding link state in its LSDB with the one received. The failed link is the link in the link state in its LSDB, but not in the link state just received. If all the links on the current FT attached to node X failed, then the sequential FT repair process 600 determines that node X on the current FT has failed.

At step 608, the sequential FT repair process 600 determines whether the current FT is split. For a failed link on the current FT between node A and node B, the sequential FT repair process 600 may determine whether the current FT is split by attempting to find a path on the current FT from node A to node B. If a path is found on the current FT, then the current FT is not split; otherwise (i.e., there is not any path from node A to node B on the current FT), the current FT is split. Alternatively, the sequential FT repair process 600 may determine whether the current FT is split by retrieving a first number of nodes on the current FT through traversing the current FT and maintaining a second number of active or live nodes in its LSDB. If the first number of nodes is less than the second number of active or live nodes in its LSDB, then the current FT is split. In an embodiment, if the first number of nodes is greater than the second number of active or live nodes in its LSDB, then there is a problem in the network or inside the failed node, and a warning is issued or logged. If, at step 608, the sequential FT repair process 600 determines that the FT is not split, then the sequential FT repair process 600 performs no additional action, at step 612, and terminates. However, if at step 608, the sequential FT repair process 600 determines that the FT is split, then the sequential FT repair process 600, at step 610, repairs the FT (e.g., as described in FIG. 7).

Figure 7:
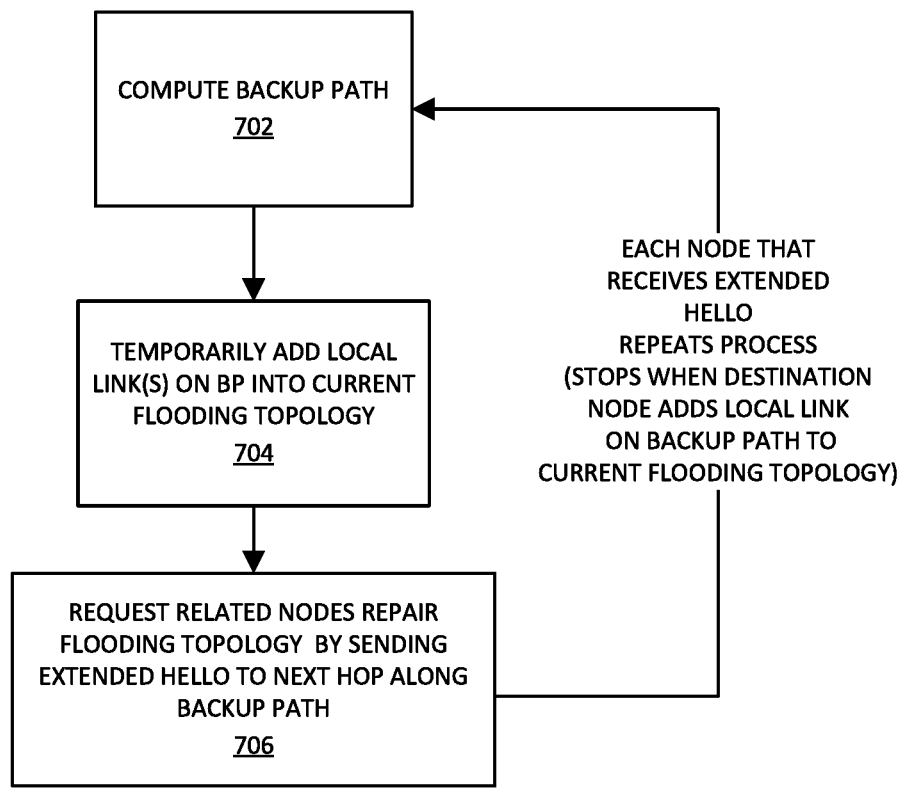
FIG. 7 is a flowchart illustrating a sequential FT repair in accordance with an embodiment of the present disclosure.

FIG. 7 is a flowchart illustrating a FT repair process 700 in accordance with an embodiment of the present disclosure.

In an embodiment, the FT repair process 700 is first performed by a node next to a failure, and then by each next hop node along a backup path. The FT repair process 700 begins, at step 702, by computing a backup path. If the FT repair process 700 is being executed by the node next to a failure, the FT repair process 700 computes a backup path from the current executing node (node A) to each of the other nodes connected to the failure point (node X) via a link on the current FT.

The FT repair process 700, at step 704, adds the local link(s) (e.g., link L1) of the executing node on the backup path into the current FT temporarily until a new FT is built, if the local link(s) are not on the current FT. At step 706, the FT repair process 700 requests related nodes repair the FT by sending a request in an extended Hello packet (e.g., FIG. 8) to a next hop node along the backup path (e.g., sending Hello to link L1's remote end node).

After receiving the extended Hello, the remote end node repeats the FT repair process 700 by computing a backup path from node A (i.e., the current node) to node X at step 702, adding its local links (e.g., links L1 and L2), at step 704, on the backup path into the current FT temporarily until a new FT is built if they are not on the current FT, and sending, at step 706, a request in an extended Hello packet to a next hop node along the backup path (e.g., sending Hello to link L2's remote end node). The FT repair process 700 terminates when the destination node adds the local link on the backup paths to the current FT.

Figure 8:
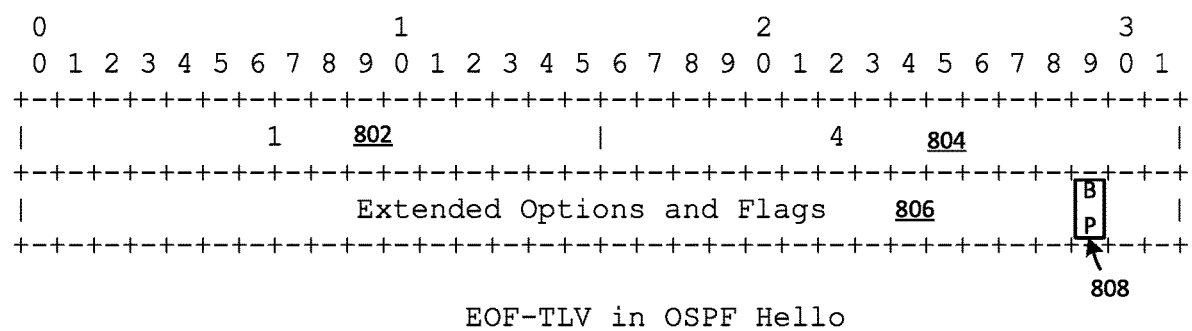
FIG. 8 is a schematic diagram illustrating a data structure of an Extended Options and Flag (EOF) Type-Length-Value (TLV) in accordance with an embodiment of the present disclosure.

FIG. 8 is a schematic diagram illustrating a data structure of an Extended Options and Flag (EOF) Type-Length-Value (TLV) 800 in accordance with an embodiment of the present disclosure. The EOF-TLV 800 can be included in an OSPF Hello packet. For instance, in an embodiment, the EOF-TLV 800 is included in a link-local signaling (LLS) data block of an OSPF Hello packet that is used to discover and maintain neighbor relationships. In the depicted embodiment, the EOF-TLV 800 includes a type field 802 (type 1 is an EOF-TLV defined in Request For Comments (RFC) 5613), a length field 804 containing the length of the EOF-TLV 800, and an Extended Options and Flags field 806. In an embodiment, a new flag bit, called creating backup path (BP-bit 808), is defined in the Extended Options and Flags field 806 in the EOF-TLV 800. In an embodiment, bit 29 in the Extended Options and Flags field 806 is used for the BP-bit 808.

As described in FIG. 7, when a node B receives a Hello packet, containing the EOF-TLV 800, from its adjacent node A over a link, if the BP-bit 808 is set to one (1) in the EOF-TLV 800, then it indicates that the link on a backup path is temporarily added on the current FT by node A. Node B will then also add the link temporarily on the current FT until a new FT is built, compute the backup path if it is not in the Hello packet, and send the Hello packet with some information about the path to a next hop along the path.

Figure 9:
FIG. 9 is a schematic diagram illustrating a data structure of an OSPF Backup Path End Points TLV in accordance with an embodiment of the present disclosure.

FIG. 9 is a schematic diagram illustrating a data structure of an OSPF Backup Path End Points TLV 900 in accordance with an embodiment of the present disclosure. The OSPF Backup Path End Points TLV 900 can be carried in the link-local signaling (LLS) data block of an OSPF Hello packet. The OSPF Backup Path End Points TLV 900 includes a type field 902 (the type is to be determined (TBD)), a length field 904, a source node identifier (ID) field 906, a destination node ID field 908, and an optional sub-TLVs field 910. The source node ID field 906 and the destination node ID field 908 specify the two end nodes of a backup path. The sub-TLVs 910 may be defined to contain the backup path in details. For example, the sub-TLVs 910 may contain every hop of the backup path.

FIG. 10 is a schematic diagram illustrating a data structure of an Extended Options and Flag (EOF) TLV 1000 in accordance with an embodiment of the present disclosure. In an embodiment, the EOF-TLV 1000 is included in an IS-IS Hello packet that is used to discover and maintain neighbor relationships. The EOF-TLV 1000 includes a type field 1002 (TBD), a length field 1004, and an Extended Options and Flags field 1006. In an embodiment, a new flag bit, called creating backup path (BP-bit 1008), is defined in the Extended Options and Flags field 1006 in the EOF-TLV 1000. In an embodiment, bit 29 in the Extended Options and Flags field 1006 in the EOF-TLV TLV 1000 is used for the BP-bit 1008.

In an embodiment, when a node B receives a Hello packet containing the EOF-TLV 1000 from its adjacent node A over a link, if the BP-bit 1008 is set to one (1) in the Hello packet, then this indicates that the link on a backup path is temporarily added on the current FT by node A. Node B will then also add the link temporarily on the current FT until a new FT is built, compute the backup path if it is not in the Hello packet, and send a Hello packet with some information about the path to a next hop along the path.

FIG. 11 is a schematic diagram illustrating a data structure of an IS-IS Backup Path End Points TLV 1100 in accordance with an embodiment of the present disclosure. The IS-IS Backup Path End Points TLV 1100 can be carried in an IS-IS Hello packet. The IS-IS Backup Path End Points TLV 1100 includes a type field 1102 (TBD), a length field 1104, a source node ID field 1106, a destination node ID field 1108, and an optional sub-TLVs field 1110. The source node ID field 1106 and the destination node ID field 1108 specify the two end nodes of a backup path. The sub-TLVs 1110 may be defined to contain the backup path in details. For example, the sub-TLVs 1110 may contain every hop of the backup path.

Figure 12:
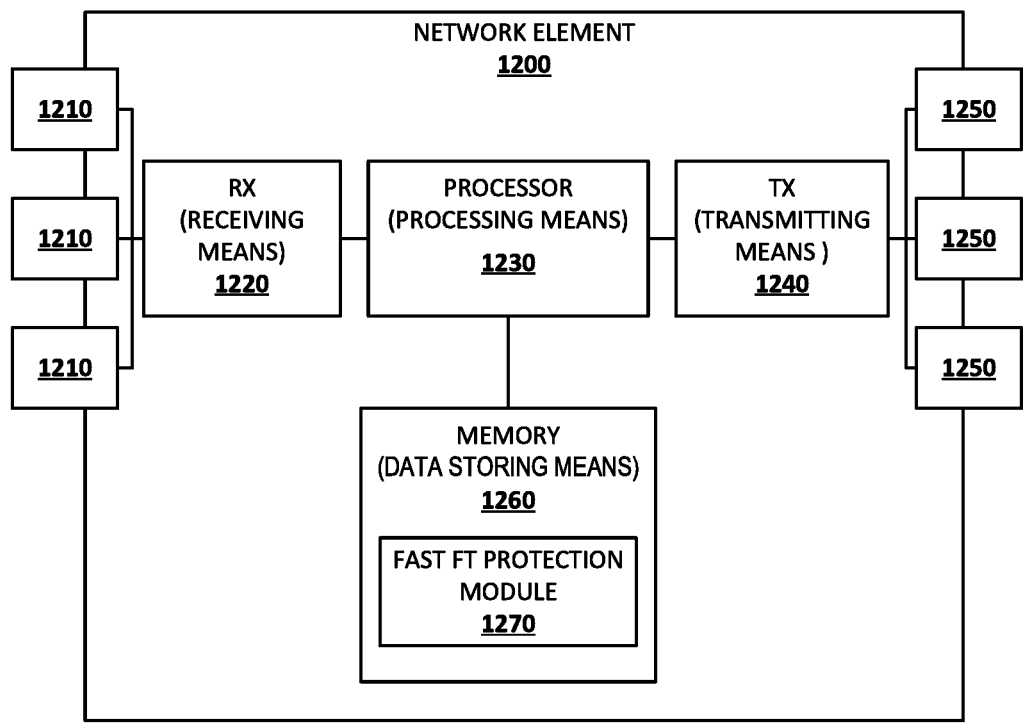
FIG. 12 is a schematic diagram illustrating a network element according to an embodiment of the present disclosure.

FIG. 12 is a schematic diagram illustrating a network element 1200 according to an embodiment of the present disclosure. The network element 1200 can be any network node such as, but not limited to, any router, switch, and controller, which are used by the service providers around world. The network element 1200 includes receiver units (RX) 1220 or receiving means for receiving data via ingress ports 1210. The network element 1200 also includes transmitter units (TX) 1240 or transmitting means for transmitting via data egress ports 1250.

The network element 1200 includes a memory 1260 or data storing means for storing the instructions and various data. The memory 1260 can be any type of or combination of memory components capable of storing data and/or instructions. For example, the memory 1260 can include volatile and/or non-volatile memory such as read-only memory (ROM), random access memory (RAM), ternary content-addressable memory (TCAM), and/or static random-access memory (SRAM). The memory 1260 can also include one or more disks, tape drives, and solid-state drives. In some embodiments, the memory 1260 can be used as an over-flow data storage device to store programs when such programs are selected for execution, and to store instructions and data that are read during program execution.

The network element 1200 has one or more processor 1230 or other processing means (e.g., central processing unit (CPU)) to process instructions. The processor 1230 may be implemented as one or more CPU chips, cores (e.g., as a multi-core processor), field-programmable gate arrays (FPGAs), application specific integrated circuits (ASICs), and digital signal processors (DSPs). The processor 1230 is communicatively coupled via a system bus with the ingress ports 1210, RX 1220, TX 1240, egress ports 1250, and memory 1260. The processor 1230 can be configured to execute instructions stored in the memory 1260. Thus, the processor 1230 provides a means for performing any computational, comparison, determination, initiation, configuration, or any other action corresponding to the claims when the appropriate instruction is executed by the processor. In some embodiments, the memory 1260 can be memory that is integrated with the processor 1230.

In one embodiment, the memory 1260 stores a fast FT protection module 1270. The fast FT protection module 1270 includes data and executable instructions for implementing the disclosed embodiments. For instance, the fast FT protection module 1270 can include instructions for implementing the methods described in FIGS. 4-7. The inclusion of the fast FT protection module 1270 substantially improves the functionality of the network element 1200 by enabling fast repair of a FT, which, among other things, reduces traffic loss when there is a FT split.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the disclosure is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

The invention claimed is:

1. A parallel flooding topology repair method performed by a network node, the parallel flooding topology repair method comprising:
   detecting a network failure, the network failure being at least one of a failed link or a failed node;
   determining that the network failure is on a flooding topology, wherein the flooding topology is a sub-network of a physical network topology and is used to distribute link state information of each router in the physical network topology;
   determining whether the flooding topology is split due to the network failure; and
   repairing a local flooding topology when the flooding topology is split due to the network failure.

2. The parallel flooding topology repair method of claim 1, wherein repairing the local flooding topology comprises:
   computing a backup path for the network failure to repair the flooding topology;
   determining whether the backup path traverses the network node;
   determining whether local links of the network node on the backup path are on the flooding topology when the backup path traverses the network node; and
   adding the local links of the network node on the backup path into the flooding topology temporarily until a new flooding topology is built when the local links of the network node on the backup path are not on the flooding topology.

3. The parallel flooding topology repair method of claim 1, wherein the failed link is detected by one of identifying a link in a link state database (LSDB) of the network node that is not in a received link state, or locally through a link down event, and wherein the failed node is detected by determining that every link attached to the failed node has failed.

4. The parallel flooding topology repair method of claim 1, wherein the failed link is on the flooding topology when there is a flag for the failed link in a link state database (LSDB) of the network node indicating that the failed link is on the flooding topology, or when the failed link is in a link state in a link state database (LSDB) of the network node for the flooding topology.

5. The parallel flooding topology repair method of claim 1, wherein the failed node is on the flooding topology when there is a link on the flooding topology that connects to the failed node, or when the failed node is in a link state in a link state database (LSDB) of the network node for the flooding topology.

6. The parallel flooding topology repair method of claim 1, wherein determining whether the flooding topology is split by the failed link comprises:
   determining whether there is a path on the flooding topology between a first node and a second node that was connected by the failed link;
   determining that the flooding topology is split by the failed link when there is no path on the flooding topology between the first node and the second node that was connected by the failed link; and
   determining that the flooding topology is not split by the failed link when there is the path on the flooding topology between the first node and the second node that was connected by the failed link.

7. The parallel flooding topology repair method of claim 1, wherein determining whether the flooding topology is split by the failed link comprises:
   determining a first number of nodes on the flooding topology by traversing the flooding topology;
   comparing the first number of nodes on the flooding topology to a second number of nodes on the flooding topology maintained in a link state database (LSDB) of the network node; and
   determining that the flooding topology is split when the first number of nodes on the flooding topology is less than the second number of nodes on the flooding topology.

8. The parallel flooding topology repair method of claim 1, wherein determining whether the flooding topology is split by the failed node comprises:
   determining whether the network node has a direct link to the failed node;
   determining whether there is a path on the flooding topology between the network node and every other node that was directly connected to the failed node; and
   determining that the flooding topology is split by the failed node when there is no path on the flooding topology between the network node and every other node that was directly connected to the failed node.

9. The parallel flooding topology repair method of claim 1, wherein determining whether the flooding topology is split by the failed node comprises:
- determining a first number of nodes on the flooding topology by traversing the flooding topology;
- comparing the first number of nodes on the flooding topology to a second number of nodes on the flooding topology maintained in a link state database (LSDB) of the network node; and
- determining that the flooding topology is split when the first number of nodes on the flooding topology is less than the second number of nodes on the flooding topology.

10. A sequential flooding topology repair method performed by a network node for repairing a flooding topology, the sequential flooding topology repair method comprising:
- detecting a network failure, the network failure being at least one of a failed link or a failed node;
- determining that the network failure is on the flooding topology, wherein the flooding topology is a sub-network of a physical network topology and is used to distribute link state information of each router in the physical network topology;
- determining whether the flooding topology is split due to the network failure; and
- repairing the flooding topology by performing a sequential flooding topology repair process when the flooding topology is split due to the network failure.

11. The method of claim 10, wherein the sequential flooding topology repair process comprises:
- computing a backup path from the network node to each of the other nodes connected to the network failure;
- determining whether local links of the network node on the backup path are on the flooding topology;
- adding the local links of the network node on the backup path into the flooding topology temporarily until a new flooding topology is built when the local links of the network node on the backup path are not on the flooding topology; and
- sending a flooding topology repair request to a next hop node along the backup path.

12. A sequential flooding topology repair method performed by a network node for repairing a flooding topology, the sequential flooding topology repair method comprising:
- receiving a flooding topology repair request, wherein the flooding topology is a sub-network of a physical network topology used to distribute link state information of each router in the physical network topology;
- determining whether local links of the network node on a backup path are on the flooding topology;
- adding the local links of the network node on the backup path into the flooding topology temporarily until a new flooding topology is built when the local links of the network node on the backup path are not on the flooding topology; and
- sending the flooding topology repair request to a next hop node along the backup path.

13. The method of claim 12, further comprising one of extracting the backup path from the flooding topology repair request or computing the backup path from the network node to an end node of the backup path when the flooding topology repair request does not include the backup path.

14. The method of claim 12, wherein the flooding topology repair request is an extended Hello packet, wherein the extended Hello packet is an Open Shortest Path First (OSPF) Hello packet that includes a backup path bit (BP-bit) in an Extended Options and Flags field of an Extended Options and Flag-Type-Length-Value (EOF-TLV) in the OSPF Hello packet, wherein the BP-bit is set to indicate that a link on the backup path connecting a sending node and a receiving node is temporarily added on the flooding topology by the sending node, and wherein the OSPF Hello packet includes a backup path endpoints TLV defined in a link-local signaling (LLS) data block of the OSPF Hello packet, the backup path endpoints TLV comprising two end nodes of the backup path.

15. The method of claim 12, wherein the flooding topology repair request is an extended Intermediate System to Intermediate System (IS-IS) Hello packet, wherein the extended IS-IS Hello packet is an IS-IS Hello packet that includes a backup path bit (BP-bit) in an Extended Options and Flags field of an Extended Options and Flag—Type-Length-Value (EOF-TLV) in the IS-IS Hello packet, wherein the BP-bit is set to indicate that a link on the backup path connecting a sending node and a receiving node is temporarily added on the flooding topology by the sending node, and wherein the extended IS-IS Hello packet includes a backup path endpoints TLV that comprises two end nodes of the backup path.

16. A network node, comprising:
- a memory configured to store instructions;
- a processor coupled to the memory, the processor configured to execute the instructions to cause the network node to:
  - detect a network failure, the network failure being at least one of a failed link or a failed node;
  - determine that the network failure is on a flooding topology, wherein the flooding topology is a sub-network of a physical network topology and is used to distribute link state information of each router in the physical network topology;
  - determine whether the flooding topology is split due to the network failure; and
  - repair a local flooding topology when the flooding topology is split due to the network failure.

17. The network node of claim 16, wherein repairing the local flooding topology comprises:
- compute a backup path for the network failure to repair the flooding topology;
- determine whether the backup path traverses the network node;
- determine whether local links of the network node on the backup path are on the flooding topology when the backup path traverses the network node; and
- add the local links of the network node on the backup path into the flooding topology temporarily until a new flooding topology is built when the local links of the network node on the backup path are not on the flooding topology.

18. The network node of claim 16, wherein the failed link is detected by one of identifying a link in a link state database (LSDB) of the network node that is not in a received link state, or locally through a link down event, and wherein the failed node is detected by determining that every link attached to the failed node has failed.

19. The network node of claim 16, wherein the failed link is on the flooding topology when there is a flag for the failed link in a link state database (LSDB) of the network node indicating that the failed link is on the flooding topology, or when the failed link is in a link state in a link state database (LSDB) of the network node for the flooding topology.

20. The network node of claim 16, wherein the failed node is on the flooding topology when there is a link on the flooding topology that connects to the failed node, or when the failed node is in a link state in a link state database (LSDB) of the network node for the flooding topology.

21. A network node comprising:
a memory configured to store instructions;
a processor coupled to the memory, the processor configured to execute the instructions to cause the network node to:
receive a flooding topology repair request;
determine whether local links of the network node on a backup path are on a flooding topology, wherein the flooding topology is a sub-network of a physical network topology and is used to distribute link state information of each router in the physical network topology;
add the local links of the network node on the backup path into the flooding topology temporarily until a new flooding topology is built when the local links of the network node on the backup path are not on the flooding topology; and
send the flooding topology repair request to a next hop node along the backup path.

22. The network node of claim 21, wherein the processor is configured to execute the instructions to cause the network node to extract the backup path from the flooding topology repair request, or compute the backup path from the network node to an end node of the backup path when the flooding topology repair request does not include the backup path.

23. The network node of claim 21, wherein the flooding topology repair request is an extended Hello packet, wherein the extended Hello packet is an Open Shortest Path First (OSPF) Hello packet that includes a backup path bit (BP-bit) in an Extended Options and Flags field of an Extended Options and Flag-Type-Length-Value (EOF-TLV) in the OSPF Hello packet, wherein the BP-bit is set to indicate that a link on the backup path connecting a sending node and a receiving node is temporarily added on the flooding topology by the sending node, and wherein the OSPF Hello packet includes a backup path endpoints TLV defined in a link-local signaling (LLS) data block of the OSPF Hello packet, the backup path endpoints TLV comprising two end nodes of the backup path.

24. The network node of claim 21, wherein the flooding topology repair request is an extended Intermediate System to Intermediate System (IS-IS) Hello packet, wherein the extended IS-IS Hello packet is an IS-IS Hello packet that includes a backup path bit (BP-bit) in an Extended Options and Flags field of an Extended Options and Flag—Type-Length-Value (EOF-TLV) in the IS-IS Hello packet, wherein the BP-bit is set to indicate that a link on the backup path connecting a sending node and a receiving node is temporarily added on the flooding topology by the sending node, and wherein the extended IS-IS Hello packet includes a backup path endpoints TLV that comprises two end nodes of the backup path.

* * * * *